United States Patent
Andrejczyk et al.

(10) Patent No.: US 9,944,400 B2
(45) Date of Patent: Apr. 17, 2018

(54) ADAPTIVE ENGINE ACCELERATION FOR ACCESSORY LOADS

(71) Applicant: Sikorsky Aircraft Corporation, Stratford, CT (US)

(72) Inventors: Robert J. Andrejczyk, Sandy Hook, CT (US); David H. Sweet, Jupiter, FL (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 538 days.

(21) Appl. No.: 14/618,095

(22) Filed: Feb. 10, 2015

(65) Prior Publication Data

US 2015/0225088 A1 Aug. 13, 2015

Related U.S. Application Data

(60) Provisional application No. 61/938,383, filed on Feb. 11, 2014.

(51) Int. Cl.

| | |
|---|---|
| *G06F 19/00* | (2011.01) |
| *G06G 7/70* | (2006.01) |
| *B64D 31/06* | (2006.01) |
| *F02D 41/02* | (2006.01) |
| *F02D 41/10* | (2006.01) |
| *B60R 16/03* | (2006.01) |
| *B64D 43/00* | (2006.01) |
| *B64D 45/00* | (2006.01) |

(Continued)

(52) U.S. Cl.
CPC ............. *B64D 31/06* (2013.01); *B60R 16/03* (2013.01); *B64D 43/00* (2013.01); *B64D 45/00* (2013.01); *F02D 29/02* (2013.01); *F02D 41/021* (2013.01); *F02D 41/10* (2013.01); *F02D 41/1497* (2013.01); *B64D 2221/00* (2013.01); *F02D 2250/18* (2013.01); *F02D 2250/22* (2013.01)

(58) Field of Classification Search
CPC ........ B64D 27/10; B64D 31/06; B60R 16/03; F02D 41/1497
USPC .......................................... 701/100; 340/945
See application file for complete search history.

(56) References Cited

U.S. PATENT DOCUMENTS

| | | | | |
|---|---|---|---|---|
| 2,208,299 | A * | 7/1940 | Marcus | F02D 17/04 123/198 D |
| 5,220,322 | A * | 6/1993 | Bateman | G01C 5/005 340/967 |
| 5,606,245 | A | 2/1997 | Kirby | |

(Continued)

OTHER PUBLICATIONS

Maasoumy et al., "Optimal Load Management System for Aircraft Electric Power Distribution", 52nd IEEE Conference of Decision and Control, Dec. 2013, pp. 2939-2945.

(Continued)

*Primary Examiner* — Isaac G Smith
(74) *Attorney, Agent, or Firm* — Cantor Colburn LLP

(57) ABSTRACT

A method of adaptive engine acceleration for accessory loads includes receiving an accessory load indicator corresponding to an accessory load of an engine. The accessory load indicator is compared to an adjustment threshold. An acceleration rate of the engine is increased based on determining that the accessory load indicator is below the adjustment threshold. The acceleration rate of the engine is decreased based on determining that the accessory load indicator is above the adjustment threshold.

18 Claims, 4 Drawing Sheets

(51) Int. Cl.
F02D 41/14 (2006.01)
F02D 29/02 (2006.01)

(56) References Cited

U.S. PATENT DOCUMENTS

| | | |
|---|---|---|
| 6,480,780 B1 * | 11/2002 | Schwamm ............... G05B 9/03 |
| | | 123/319 |
| 7,285,871 B2 | 10/2007 | Derouineau |
| 9,302,636 B2 | 4/2016 | Schult et al. |
| 9,382,010 B2 | 7/2016 | Chen et al. |
| 2011/0173988 A1 * | 7/2011 | Sweet .................... B64D 31/06 |
| | | 60/773 |
| 2013/0184901 A1 | 7/2013 | Wall et al. |
| 2013/0199198 A1 * | 8/2013 | Corpron ................... F01D 5/12 |
| | | 60/773 |
| 2013/0234506 A1 | 9/2013 | Langford et al. |
| 2014/0125121 A1 | 5/2014 | Edwards et al. |
| 2014/0297155 A1 * | 10/2014 | Chen ........................ F02C 9/28 |
| | | 701/100 |
| 2014/0333126 A1 | 11/2014 | Vyas |
| 2015/0081193 A1 * | 3/2015 | Gordon .................... F02C 9/28 |
| | | 701/100 |
| 2015/0097422 A1 | 4/2015 | Toothman et al. |
| 2015/0225089 A1 | 8/2015 | Judge et al. |

OTHER PUBLICATIONS

Schlabe et al., "Energy Management of Aircraft Electrical Systems—State of the Art and Further Directions", Electrical Systems for Aircraft, Railway and Ship Propulsion (ESARS), Oct. 2012, pp. 1-6.

\* cited by examiner

ADAPTIVE ENGINE ACCELERATION FOR ACCESSORY LOADS

CROSS-REFERENCE TO RELATED APPLICATIONS

This application claims the benefit of U.S. provisional patent application Ser. No. 61/938,383 filed Feb. 11, 2014, the entire contents of which are incorporated herein by reference.

BACKGROUND OF THE INVENTION

The subject matter disclosed herein generally relates to engine control systems, and more particularly to adaptive engine acceleration for accessory loads of an engine.

Engine acceleration and resultant aircraft handling qualities are often compromised by a requirement to remain below the engine manufacturer's peak loading specifications for engine-driven accessory loads which are geared to an accessory gearbox (AGB) of the engine. Accessory loads on the AGB compete against the ability to quickly accelerate the engine to develop power. Accessory loads can include pumps, generators, and the like. There is a tradeoff between the maximum accessory loads that can be accommodated by the engine versus an acceleration schedule of the engine. In a rotorcraft, slow engine acceleration can lead to poor rotor speed management, which diminishes handling with excessive yaw disturbances and an inability to arrest descent quickly. Poor rotor management requires excessive pilot intervention, elevating cockpit work-load and hindering attention to other tasks requiring eyes-out-of the cockpit.

Further, turbine helicopter engines are limited in the amount of power that can be extracted from the AGB as driven by the engine compressor (Ng). Excessive loads on the AGB consume engine surge margin and, if poorly managed, can lead to engine damage at the pad drive, engine compressor stall and loss of engine power. As a consequence, the engine manufacturer typically assumes that maximum loads on the AGB are present all the time and penalizes the engine acceleration schedule accordingly. For example of an engine accessory limitation, a starter/generator is typically mounted to an engine-compressor-driven pad of the AGB and directly affect the ability of the engine compressor to accelerate during rapid power demand, as occurs in helicopter maneuvering. If the electrical load is not limited, it could cause an engine surge. The engine acceleration schedule is typically designed for a worst case peak electrical load, while also assuming that the worst case could occur when the engine is least able to tolerate it, such as maximum acceleration from a low-power condition. As such, both the amount of allowable electrical load and the maximum engine acceleration rate are conservatively constrained. This has an undesirable result of limiting system electrical capacity and limiting aircraft maneuvering performance, i.e., handling qualities.

BRIEF DESCRIPTION OF THE INVENTION

According to an aspect of the invention, a method of adaptive engine acceleration for accessory loads includes receiving an accessory load indicator corresponding to an accessory load of an engine. The accessory load indicator is compared to an adjustment threshold. An acceleration rate of the engine is increased based on determining that the accessory load indicator is below the adjustment threshold. The acceleration rate of the engine is decreased based on determining that the accessory load indicator is above the adjustment threshold.

In addition to one or more of the features described above or below, or as an alternative, further embodiments could include where the accessory load indicator is based on a sensed level of accessory load driven by the engine.

In addition to one or more of the features described above or below, or as an alternative, further embodiments could include where the sensed accessory load is crosschecked with respect to a second sensed accessory load.

In addition to one or more of the features described above or below, or as an alternative, further embodiments could include where increasing the acceleration rate and decreasing the acceleration rate are performed proportionally with respect to one or more engine acceleration schedules.

In addition to one or more of the features described above or below, or as an alternative, further embodiments could include where an adjustment to the acceleration rate is determined by a first channel of an electronic engine control and is crosschecked with respect to a second channel of the electronic engine control.

In addition to one or more of the features described above or below, or as an alternative, further embodiments could include where the one or more engine acceleration schedules are adjusted based on confirming that the adjustment to the acceleration rate determined by the first channel matches the second channel.

In addition to one or more of the features described above or below, or as an alternative, further embodiments could include where a default version of the one or more engine acceleration schedules is selected to accommodate a maximum accessory load based on a mismatch between the first channel and the second channel.

In addition to one or more of the features described above or below, or as an alternative, further embodiments could include where an adjustment of the one or more engine acceleration schedules is based on a sensed airframe load.

In addition to one or more of the features described above or below, or as an alternative, further embodiments could include determining a magnitude of acceleration rate decrease based on decreasing the acceleration rate of the engine, comparing the magnitude of acceleration rate decrease to a warning threshold, and triggering a pilot warning of reduced acceleration capability based on determining that the magnitude of acceleration rate decrease is greater than the warning threshold.

In addition to one or more of the features described above or below, or as an alternative, further embodiments could include sharing engine acceleration schedule adjustments between electronic engine controls of the engine and a second engine, and equalizing engine contributions by averaging acceleration demand between the engine and the second engine to deliberately equalize engine compressor-starting points.

In addition to one or more of the features described above or below, or as an alternative, further embodiments could include where the engine is on an aircraft and an adjustment magnitude of the acceleration rate of the engine is based on one or more of: an engine age parameter and a determination as to whether the aircraft is in-flight or grounded.

According to further aspects of the invention, an engine control system includes a processor and memory having instructions stored thereon that, when executed by the processor, cause the engine control system to receive an accessory load indicator corresponding to an accessory load of an engine. The accessory load indicator is compared to an adjustment threshold. An acceleration rate of the engine is increased based on determining that the accessory load indicator is below the adjustment threshold. The acceleration rate of the engine is decreased based on determining that the accessory load indicator is above the adjustment threshold.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION OF THE INVENTION

Figure 1:
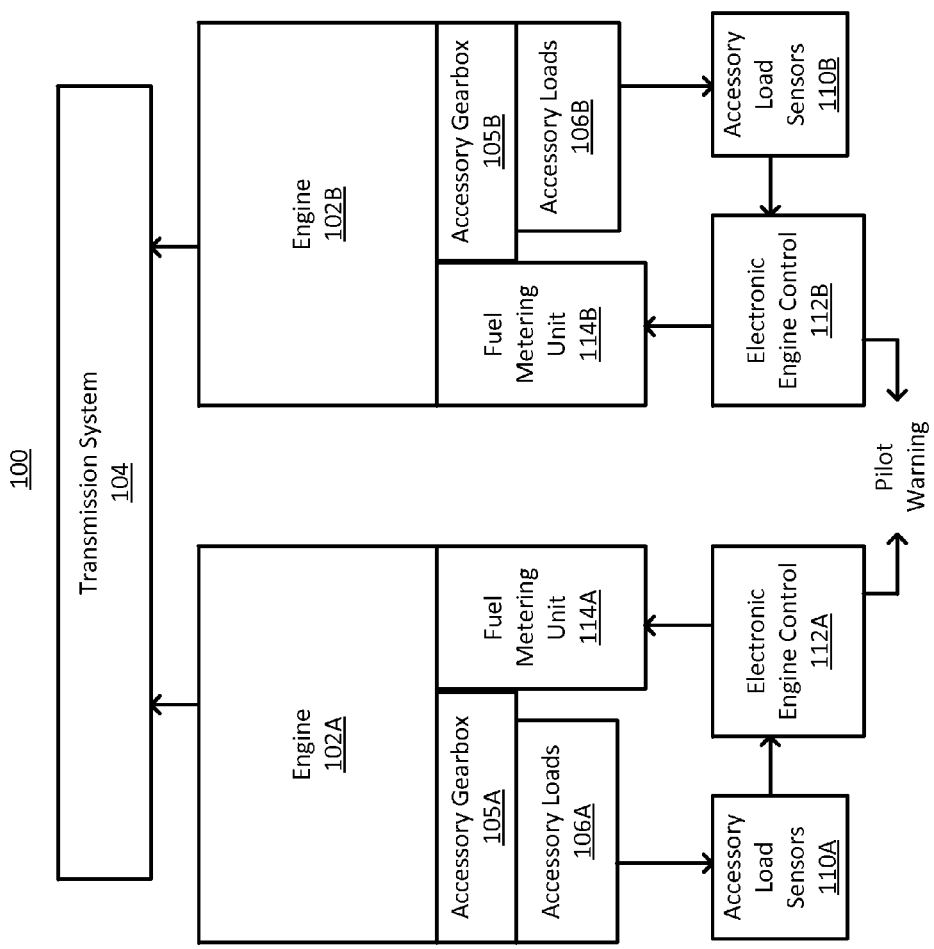
FIG. 1 schematically depicts an engine system in accordance with an embodiment.

In embodiments, an engine control system for an aircraft, such as a rotorcraft, monitors loading on each engine and adjusts each engine acceleration schedule to enable increased acceleration when loading is below an adjustment threshold and decreased acceleration when loading is above the adjustment threshold. Rather than assuming that loading is equivalent to the worst-case transient loading, dynamic adjustment of an engine acceleration schedule enhances aircraft responsiveness during typical operational loads while also preserving engine surge margin across the operational envelope. The engine acceleration schedule can be adjusted proportionally with respect to observed loads using, for example, a sensed current of a generator driven by the engine as an accessory load indicator corresponding to the accessory load of the engine. Adaptive acceleration can be particularly beneficial in a twin-engine helicopter when one engine typically carries more electrical load than the other. If the engines have the adaptive acceleration capability as described herein, the more lightly loaded engine can put more power into the aircraft transmission faster to compensate for the more slowly accelerating engine which has a higher generator pad load. The more loaded engine can provide greater load capability because its slower acceleration is not as critical to handling qualities in a twin-engine application. This improves aircraft handling qualities and enables a larger electrical load capacity.

Accessory load is measured by an appropriate sensor which is used as an input to an electronic engine control, i.e., a Full Authority Digital Engine Control (FADEC), for each engine. Each FADEC typically includes at least two separate processing systems, referred to as "channels". Dedicated sensors, one-each per FADEC channel, provides for cross-check fault detection and redundancy. The FADEC software increases or decreases each engine's acceleration schedule proportional to its accessory load sensor signal. In the case of an erroneous or indeterminate load, fail-safe logic provides a default (slower) acceleration schedule which can safely accommodate the maximum accessory load. Cockpit displays are provided to annunciate/warn the pilot of a reduction in handling response due to the imposition of the default acceleration schedule. In a similar fashion, engine compressor bleed air extraction could be a sensed-signal, and engine operation (steady-state or transitory) can be adjusted accordingly. Traditional aircraft installations assume that bleed-extraction is set to its maximum (equivalent to a full breech in the pneumatic line) and engine operability and power-available are severely limited.

Prior technology, without acceleration adapted to accessory loads, must assume that the maximum accessory load is present all the time, which significantly penalizes acceleration capability when such loads are not high. This requires a tradeoff of load capability versus aircraft handling which may prevent acceptable aircraft operations at high-altitude airports due to unacceptable handling qualities when typical accessory loads are present. Embodiments as described herein result in increased/shared accessory load capability, coupled with an increased acceleration capability, thereby improving both accessory accommodation and aircraft handling leading to expanded and safer flight operations. More broadly, any sensed signal originating from the airframe can be used to optimize the engine's acceleration schedule to continually maximize engine performance while preserving engine surge margin and protecting against the exceeding of engine specifications. Such signals are not limited to a simple DC generator nor limited to adjustments solely based on engine acceleration schedules.

Accessory load sensors are employed to redundantly communicate electrical load conditions to each engine FADEC. Based on the monitoring of accessory load, the FADEC will reduce the engine acceleration schedule when accessory loads are high to protect from engine surge. This has an insignificant effect on aircraft maneuvering in most conditions. As a failsafe backup, the FADEC manages acceleration schedules to protect from surge, including a default conservative acceleration schedule if load monitoring is lost. The FADEC also annunciates a degraded handling caution to the pilot when failures have significant impact on aircraft handling qualities.

The result is a higher accessory load capability and higher engine acceleration capability than otherwise possible. The higher acceleration capability improves aircraft handling by minimizing rotor droop during maneuvering. The system allows for the seamless operation of acceleration schedule management to the flight crew. It employs system redundancy and fault checks for system integrity, and failsafe design with appropriate pilot warning.

FIG. 1 schematically depicts an engine system 100 in accordance with embodiments. In the example of FIG. 1, a first engine 102A and a second engine 102B are mechanically coupled through a transmission system 104 that can drive a rotor of a rotorcraft. Engine 102A drives an accessory gearbox 105A, which in turn drives one or more accessory loads 106A. Examples of the accessory loads 106A can include DC generators, fuel pumps, hydraulic fluid pumps, pneumatic pressure pumps, compressor bleed extraction, and the like. One or more accessory load sensors 110A monitor the accessory loads 106A and provide accessory load sensor input to electronic engine control 112A (which is also be referred to as a FADEC). The electronic engine control 112A monitors a number of parameters of the engine 102A and receives input from other sources (not depicted), such as a flight management computer, pilot inputs, and the like. The electronic engine control 112A outputs a fuel metering unit command to a fuel metering unit 114A that establishes a rate of fuel flow to the engine 102A.

Similarly, engine 102B drives an accessory gearbox 105B, which in turn drives a one or more accessory loads 106B. One or more accessory load sensors 110B monitor the accessory loads 106B and provide accessory load sensor input to electronic engine control 112B. The electronic engine control 112B monitors a number of parameters of the engine 102B and receives input from other sources (not depicted), such as a flight management computer, pilot inputs, and the like. The electronic engine control 112B outputs a fuel metering unit command to a fuel metering unit 114B that establishes a rate of fuel flow to the engine 102B.

The electronic engine controls 112A and 112B each include one or more engine acceleration schedules that set a maximum rate of engine acceleration with respect to one or more flight control parameters, such as airspeed, altitude, current engine speed, and other known flight control parameters. The electronic engine controls 112A and 112B can also monitor the accessory load sensors 110A and 110B to adjust the engine acceleration schedules. For example, sensed currents of DC generators can be accessory load indicators that approximate the accessory load placed on the engines 102A and 102B. As another example, accessory load indicators can be based on one or more pressure transducers that are indicative of accessory pump loads of accessory loads 106A and 106B. A higher accessory load reduces the engine surge margin during acceleration. Similarly, a lower accessory load provides a greater margin such that greater engine acceleration can be supported safely. An acceleration rate of each engine 102A and 102B is increased based on determining that its respective accessory load indicator is below an adjustment threshold and is decreased based on determining that the accessory load indicator is above the adjustment threshold. As such, the engine acceleration schedules of each engine 102A and 102B can vary with respect to each other as accessory loading varies.

Figure 2B:
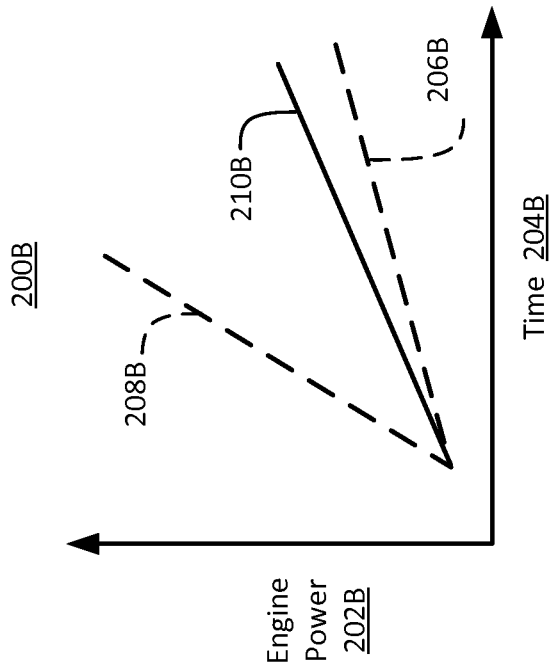
FIG. 2B depicts a further adjustment to the engine acceleration schedule of FIG. 2A in accordance with an embodiment.
Figure 2A:
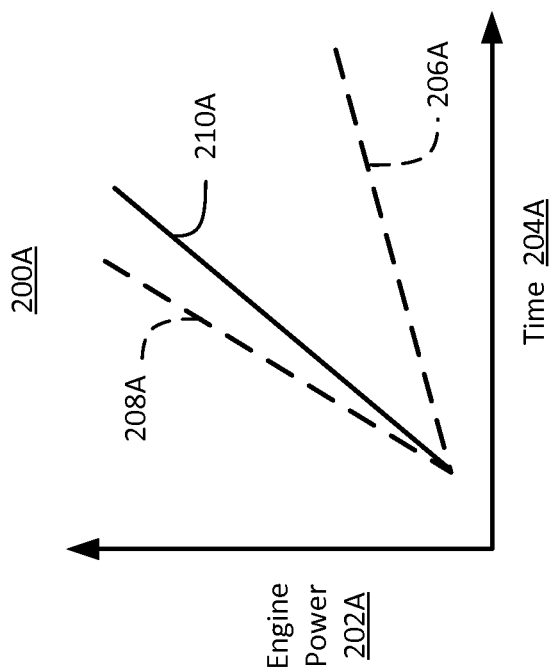
FIG. 2A depicts one example of an adjusted engine acceleration schedule in accordance with an embodiment.

FIGS. 2A and 2B depict examples of engine acceleration schedule variations in accordance with an embodiment. Plot 200A of FIG. 2A illustrates an example of engine power 202A versus time 204A, as engine acceleration 210A is increased above a default acceleration 206A that results from a default version of an engine acceleration schedule defined for worst-case loading. A maximum upper limit 208A may be defined to prevent the engine acceleration 210A from being adjusted beyond a safety limit. Plot 200B depicts a second example of engine power 202B versus time 204B, as engine acceleration 210B is adjusted between default acceleration 206B and maximum upper limit 208B. As can be seen in FIGS. 2A and 2B, engine acceleration 210A and 210B can be increased or decreased based on an accessory load indicator, such as sensed loads of accessory loads 106A and 106B of FIG. 1.

Figure 3:
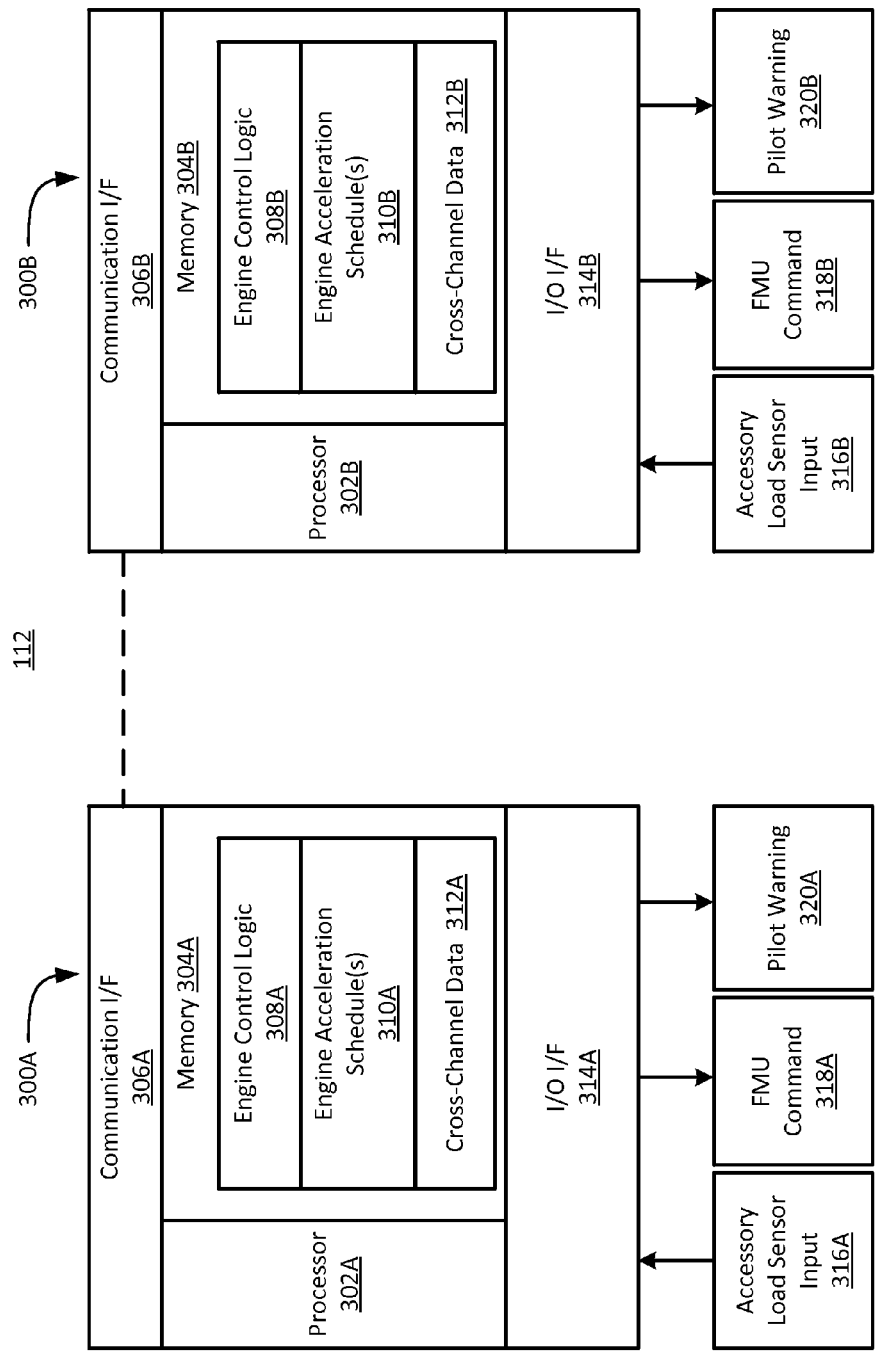
FIG. 3 schematically depicts a block diagram of an electronic engine control in accordance with embodiments.

FIG. 3 schematically depicts a block diagram of an electronic engine control 112 as an example of one of the electronic engine controls 112A or 112B of FIG. 1 in accordance with embodiments. Both electronic engine controls 112A and 112B of FIG. 1 can be implemented as multi-channel controls. The example of FIG. 3 depicts a dual-channel control, where each channel 300A and 300B includes a separate processing system. Channel 300A includes a processor 302A, memory 304A, and a communication interface 306A. Similarly, channel 300B includes a processor 302B, memory 304B, and a communication interface 306B. Processor 302A, 302B can be any type or combination of computer processors, such as a microprocessor, microcontroller, digital signal processor, application specific integrated circuit, programmable logic device, and/or field programmable gate array. The memory 304A, 304B is an example of a non-transitory computer readable storage medium tangibly embodied in channels 300A, 300B including executable instructions stored therein, for instance, as firmware. Examples of instructions that can be stored in the memory 304A, 304B for execution by processor 302A, 302B include engine control logic 308A, 308B. Engine control logic 308A, 308B includes instructions to control operation of an engine, such as engine 102A or 102B of FIG. 1. In addition to applying known engine control algorithms, engine control logic 308A, 308B can adjust one or more engine acceleration schedules 310A, 310B.

Input/output interface 314A, 314B can receive accessory load sensor input 316A, 316B from sensors 110A or 110B of FIG. 1. The input/output interface 314A, 314B can drive fuel metering unit command 318A, 318B to fuel metering unit 114A or 114B of FIG. 1. The input/output interface 314A, 314B can also drive a pilot warning 320A, 320B to a pilot interface in an aircraft cockpit (not depicted). Although both channels 300A, 300B can output a fuel metering unit command 318A, 318B and pilot warning 320A, 320B, in embodiments that operate in an active channel—standby channel configuration, driving of outputs may be limited to the channel 300A or 300B designated as the active channel.

The communication interface 306A, 306B enables cross-channel communication to exchange cross-channel data 312A, 312B. The example electronic engine control 112 of FIG. 3 is associated with a single engine, such as either engine 102A or 102B of FIG. 1. The accessory load sensor input 316A, 316B is received from separate sensors, such as pairs of electrical current and/or pressure sensors, which independently monitor substantially the same accessory load. Values of the accessory load sensor input 316A, 316B or variations thereof can be exchanged between channels 300A, 300B in the cross-channel data 312A, 312B. The channels 300A, 300B may also exchange copies of the engine acceleration schedules 310A, 310B in the cross-channel data 312A, 312B in embodiments where the engine acceleration schedules 310A, 310B are directly modified by engine control logic 308A, 308B. The cross-channel data 312A, 312B can also or alternatively include a computed adjustment for the engine acceleration schedules 310A, 310B rather than complete schedules. As one example, an adjustment can be a proportional gain applied to a portion of the engine acceleration schedules 310A, 310B. Further, the cross-channel data 312A, 312B may include a copy of the fuel metering unit command 318A, 318B for comparison to ensure that each channel 300A, 300B is computing consistent results.

Figure 4:
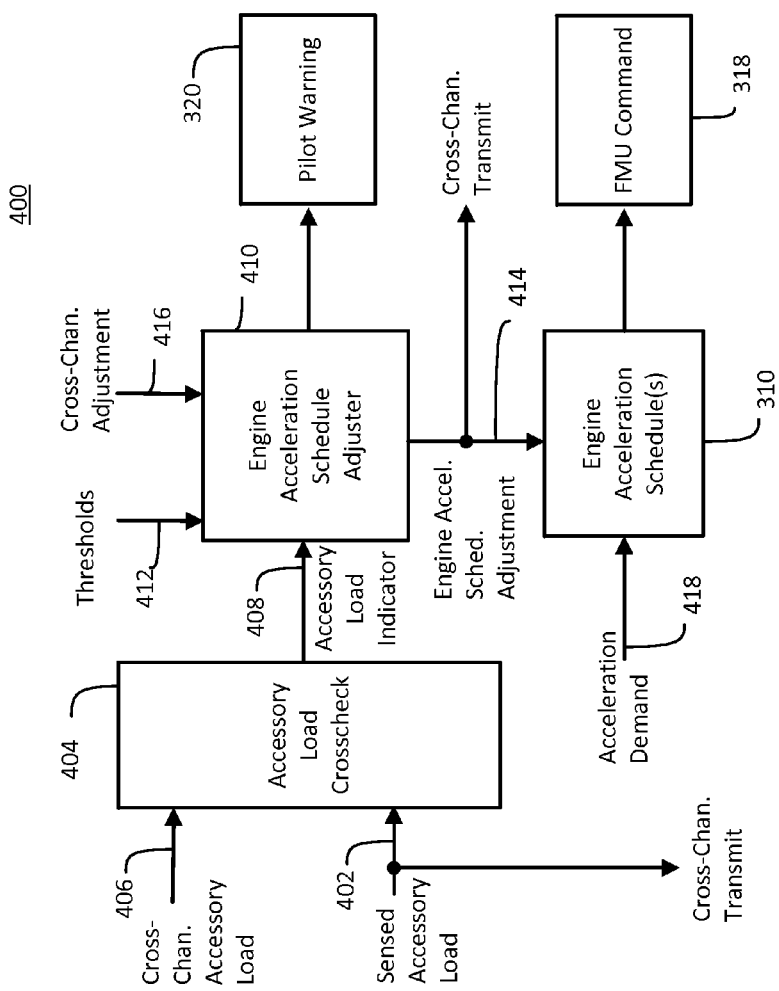
FIG. 4 schematically depicts a block diagram of a data flow for adaptive engine acceleration for accessory loads of an engine in accordance with embodiments.

FIG. 4 schematically depicts a block diagram of a data flow 400 for adaptive engine acceleration for accessory loads of an engine in accordance with embodiments. The data flow 400 represents a portion of the engine control logic 308A, 308B of FIG. 3. In data flow 400, a sensed accessory load 402 is received at an accessory load crosscheck 404 to be used as an accessory load indicator 408 corresponding to an accessory load of an engine, such as engine 102A or 102B of FIG. 1. The sensed accessory load 402 may be based on a sensed current of a generator driven by an engine from the accessory load sensors 110A or 110B of FIG. 1. Alternatively, the sensed accessory load 402 may be based on a sensed value associated with accessory loads 106A or 106B of FIG. 1. The sensed accessory load 402 is crosschecked by the accessory load crosscheck 404 with respect to a cross-channel accessory load 406 which is a second sensed accessory load of the same generator or other accessory load on the same engine. The cross-channel accessory load 406 can be received in cross-channel data 312A or 312B of FIG. 3 as a sensed accessory load computed by another channel 300A, 300B of FIG. 3. In the event that the sensed accessory load 402 is corrupted, the cross-channel accessory load 406 may be used as the accessory load indicator 408. If the sensed accessory load 402 and the cross-channel accessory load 406 are valid and in-range, the accessory load indicator 408 may be determined as the average of the sensed accessory load 402 and the cross-channel accessory load 406. The accessory load indicator 408 may be converted to appropriate engineering units, such as a shaft horsepower.

An engine acceleration schedule adjuster 410 can utilize a number of thresholds 412, such as at least one adjustment threshold and a warning threshold. The accessory load indicator 408 is compared to an adjustment threshold to determine whether the acceleration rate of the engine should be increased or decreased. The engine acceleration schedule adjuster 410 computes an engine acceleration schedule adjustment 414 that increases the acceleration rate of the engine based on determining that the accessory load indicator 408 is below the adjustment threshold and decreases the acceleration rate of the engine based on determining that the accessory load indicator 408 is above the adjustment threshold. The increasing and decreasing of the acceleration rate are performed proportionally with respect to one or more engine acceleration schedules 310. The engine acceleration schedule adjustment 414 of channel 300A can be crosschecked with respect to a cross-channel adjustment 416 computed by channel 300B of the electronic engine control 112 of FIG. 3. The one or more engine acceleration schedules 310 are adjusted based on confirming that the engine acceleration schedule adjustment 414 matches the cross-channel adjustment 416. A default version of the one or more engine acceleration schedules 310 may be selected to accommodate a maximum accessory load based on a mismatch between the engine acceleration schedule adjustment 414 and the cross-channel adjustment 416. The engine acceleration schedule adjustment 414 may be shared between engines 102A and 102B of FIG. 1 to equalize engine-contribution by averaging the acceleration demand between the engines 102A, 102B as well as utilizing the electronic engine control 112 of FIG. 3 to deliberately equalize the engine compressor-starting points, which differ based on the actual accessory pad-load present. As a further option, the engine acceleration schedule adjustment 414 can be based on one or more other sensed loads, such as sensed airframe loads and total-load demand. Where multiple load sources are considered, the engine acceleration schedule adjustment 414 may be based on a summation of different load sources that do not substantially overlap in load source.

The engine acceleration schedule adjuster 410 can also determine a magnitude of acceleration rate decrease based on decreasing the acceleration rate of the engine. The engine acceleration schedule adjuster 410 compares the magnitude of acceleration rate decrease to a warning threshold. The engine acceleration schedule adjuster 410 can trigger a pilot warning 320 of reduced acceleration capability based on determining that the magnitude of acceleration rate decrease is greater than the warning threshold. The engine acceleration schedule adjustment 414 may be suppressed when the aircraft is on the ground, e.g., a weight-on-wheels condition, and enabled during flight. Additionally, the pilot warning 320 can be suppressed when the aircraft is on the ground. Alternatively, the engine acceleration schedule adjustment 414 can be supported on the ground and may have a different magnitude of engine acceleration schedule adjustment 414 for on-ground versus in-flight conditions. For example, a greater engine acceleration schedule adjustment 414 can be tolerated in an on-ground condition where it is expected that demand is substantially constant and smaller than during an in-flight condition. Other parameters, such as an engine age parameter, may also modify the adjustment magnitude of the engine acceleration schedule adjustment 414 and/or thresholds 412 used to trigger an adjustment. For example, as an engine ages, the maximum achievable acceleration rate may decrease.

Fuel metering unit command 318 is adjusted based on applying the engine acceleration schedule adjustment 414 to the one or more engine acceleration schedules 310, where the fuel metering unit command 318 establishes a rate of fuel flow to the engine. Values from the one or more engine acceleration schedules 310 can be selected based on an acceleration demand 418 from a pilot input or control loop. The one or more engine acceleration schedules 310 may be single variable or multi-variable tables that depend on one or more engine or flight parameters, such as engine health, altitude, airspeed, and the like. The engine acceleration schedule adjustment 414 may be applied as a multiplier to a default value of the one or more engine acceleration schedules 310 or can be used to rescale values within the one or more engine acceleration schedules 310. Further, there may be multiple instances of the engine acceleration schedules 310 ranging between a default acceleration and a maximum upper limit, where the engine acceleration schedule adjustment 414 is used to select one of the engine acceleration schedules 310 for the fuel metering unit command 318.

Technical effects include providing dynamic maximum acceleration adjustments on a per-engine basis in response to monitored engine accessory loads of each engine.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of adaptive engine acceleration for accessory loads, the method comprising:
   receiving an accessory load indicator corresponding to an accessory load of an engine;
   comparing the accessory load indicator to an adjustment threshold;
   adjusting an acceleration schedule of the engine by increasing the acceleration schedule when the accessory load indicator is below the adjustment threshold;
   decreasing the acceleration schedule when the accessory load indicator is above the adjustment threshold; and
   selecting an acceleration value for the aircraft from the adjusted acceleration schedule based on an acceleration demand.

2. The method of claim 1, wherein the accessory load indicator is based on a sensed level of the accessory load driven by the engine.

3. The method of claim 2, wherein the accessory load is crosschecked with respect to a second sensed accessory load of the engine.

4. The method of claim 1, wherein adjusting the acceleration schedule is performed by applying a gain to one or more engine acceleration schedules.

5. The method of claim 4, wherein adjusting the acceleration schedule further comprise cross-checking a sensed accessory load obtained at a first channel of an electronic engine control and with a sensed accessory load obtained at a second channel of the electronic engine control.

6. The method of claim 5, wherein a first acceleration schedule adjustment is computed at the first channel and a second acceleration schedule adjustment is computed at the second channel, further comprising adjusting the one or more engine acceleration schedules based on confirming that the first acceleration schedule adjustment matches the second acceleration schedule adjustment.

7. The method of claim 6, further comprising selecting a default engine acceleration schedule corresponding to a maximum accessory load when the first acceleration schedule adjustment does not match the second acceleration schedule adjustment.

8. The method of claim 1, further comprising:
determining a magnitude of acceleration rate decrease based on decreasing the acceleration rate of the engine;
comparing the magnitude of acceleration rate decrease to a warning threshold; and
triggering a pilot warning of reduced acceleration capability based on determining that the magnitude of acceleration rate decrease is greater than the warning threshold.

9. The method of claim 1, further comprising:
sharing engine acceleration schedule adjustments between electronic engine controls of the engine and a second engine.

10. The method of claim 1, wherein the engine is on an aircraft and an adjustment magnitude of the acceleration rate of the engine is based a determination as to whether the aircraft is in-flight or grounded.

11. An engine control system comprising:
a processor; and
a memory having instructions stored thereon that, when executed by the processor, cause the engine control system to:
receive an accessory load indicator corresponding to an accessory load of an engine;
compare the accessory load indicator to an adjustment threshold;
adjust an acceleration schedule of the engine by increasing the acceleration schedule when the accessory load indicator is below the adjustment threshold;
decreasing the acceleration schedule when the accessory load indicator is above the adjustment threshold; and
select an acceleration value for the aircraft from the adjusted acceleration schedule based on an acceleration demand.

12. The engine control system of claim 11, wherein the accessory load indicator is based on a sensed level of the accessory load driven by the engine and the sensed accessory load is crosschecked with respect to a second sensed accessory load of the engine.

13. The engine control system of claim 11, wherein the adjustment the acceleration schedule is performed by applying a gain to one or more engine acceleration schedules.

14. The engine control system of claim 13, wherein an adjustment to the acceleration schedule is determined by cross-checking a sensed accessory load obtained at a first channel of an electronic engine control and with a sensed accessory load obtained at a second channel of the electronic engine control.

15. The engine control system of claim 14, wherein the one or more engine acceleration schedules are adjusted based on confirming that an acceleration schedule adjustment computed at the first channel matches an acceleration schedule adjustment computed at the second channel.

16. The engine control system of claim 15, wherein a default version corresponding to a maximum accessory load is selected when the first acceleration schedule adjustment does not match the second acceleration schedule adjustment.

17. The engine control system of claim 11, wherein the instructions further cause the engine control system to:
determine a magnitude of acceleration rate decrease based on the decrease of the acceleration rate of the engine;
compare the magnitude of acceleration rate decrease to a warning threshold; and
trigger a pilot warning of reduced acceleration capability based on determining that the magnitude of acceleration rate decrease is greater than the warning threshold.

18. The engine control system of claim 11, wherein the engine is on an aircraft and an adjustment magnitude of the acceleration rate of the engine is based on a determination as to whether the aircraft is in-flight or grounded, and further wherein the instructions cause the engine control system to:
share engine acceleration schedule adjustments between electronic engine controls of the engine and a second engine.

* * * * *